United States Patent
Branstad et al.

(10) Patent No.: US 6,765,911 B1
(45) Date of Patent: Jul. 20, 2004

(54) COMMUNICATIONS ADAPTER FOR IMPLEMENTING COMMUNICATIONS IN A NETWORK AND PROVIDING MULTIPLE MODES OF COMMUNICATIONS

(75) Inventors: Mark William Branstad, Rochester, MN (US); Jonathan William Byrn, Kasson, MN (US); Gary Scott Delp, Rochester, MN (US); Philip Lynn Leichty, Rochester, MN (US); Todd Edwin Leonard, Williston, VT (US); Gary Paul McClannahan, Rochester, MN (US); John Emery Nordman, Rochester, MN (US); Kevin Gerard Plotz, Byron, MN (US); John Handley Shaffer, Rochester, MN (US); Albert Alfonse Slane, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/243,858

(22) Filed: Feb. 3, 1999

(51) Int. Cl.$^7$ .............................................. H04L 12/56
(52) U.S. Cl. .................................. 370/395.1; 395/466
(58) Field of Search .......................... 370/395.1, 395.4, 370/395.41, 466, 395.5, 474, 352, 353, 354

(56) References Cited

U.S. PATENT DOCUMENTS

| | | |
|---|---|---|
| 5,274,768 A | 12/1993 | Traw et al. |
| 5,329,623 A * | 7/1994 | Smith et al. ................. 395/275 |
| 5,359,592 A | 10/1994 | Corbalis et al. |
| 5,381,407 A | 1/1995 | Chao |
| 5,533,009 A | 7/1996 | Chen |
| 5,533,020 A | 7/1996 | Byrn et al. |
| 5,535,201 A | 7/1996 | Zheng |
| 5,548,587 A | 8/1996 | Bailey et al. |
| 5,579,312 A | 11/1996 | Regache |
| 5,610,921 A | 3/1997 | Christensen |
| 5,625,625 A | 4/1997 | Oskouy et al. |
| 5,629,928 A | 5/1997 | Calvignac et al. |
| 5,633,870 A | 5/1997 | Gaytan et al. |
| 5,652,749 A | 7/1997 | Davenport et al. |
| 5,694,548 A | 12/1997 | Baugher et al. |
| 5,761,427 A * | 6/1998 | Shah et al. |
| 5,844,890 A | 12/1998 | Delp et al. |
| 5,850,398 A * | 12/1998 | King, Jr. ...................... 370/412 |
| 5,898,668 A * | 4/1999 | Shaffer ....................... 370/230 |
| 5,909,443 A | 6/1999 | Fichou et al. |
| 5,918,074 A * | 6/1999 | Wright et al. |
| 5,956,341 A * | 9/1999 | Galand et al. .............. 370/412 |
| 5,991,867 A * | 11/1999 | Fosmark ....................... 712/16 |
| 6,075,788 A * | 6/2000 | Vogel .......................... 370/395 |
| H001880 H | 10/2000 | Vines et al. |
| 6,205,151 B1 * | 3/2001 | Quay et al. .................. 370/416 |
| 6,215,772 B1 | 4/2001 | Verma |
| 6,233,250 B1 * | 5/2001 | Liu et al. ..................... 370/469 |
| 6,259,699 B1 * | 7/2001 | Opalka et al. ............... 370/398 |

FOREIGN PATENT DOCUMENTS

| | | |
|---|---|---|
| EP | 0782303 A2 | 7/1997 |
| WO | WO 98/06203 | 2/1998 |

OTHER PUBLICATIONS

"POS–PHY™ Saturn Compatible Packet Over Sonet Interface Specification for Physical Layer Devices (Level 2)" by PMC–Sierra, Inc., Saturn Group, Issue 2, Jan., 1998.
RFC 2171, "Mulitple Access Protocol Over Sonet/SDH, Version 1", by K. Murakami and M. Maruyama, Jun., 1997.
Patent Application (RO998–155), "Memory Controller with Programmable Delay Counter for Tuning Performance Based on Timing Parameter of Controlled Memory Storage Device", Ser. No. 09/166,004, filed Oct. 2, 1998, by Gary P. McClannahan.

* cited by examiner

*Primary Examiner*—Kenneth Vanderpuye
(74) *Attorney, Agent, or Firm*—Joan Pennington

(57) ABSTRACT

A method and apparatus are provided for implementing communications in a communications network. The apparatus for implementing communications includes a system interface to the communications network. A scheduler schedules enqueued cells and enqueued frames to be transmitted. A segmenter segments frames and cells in into cells or frames applied to a media adaptation block for transmission in a selected one of multiple modes.

13 Claims, 19 Drawing Sheets

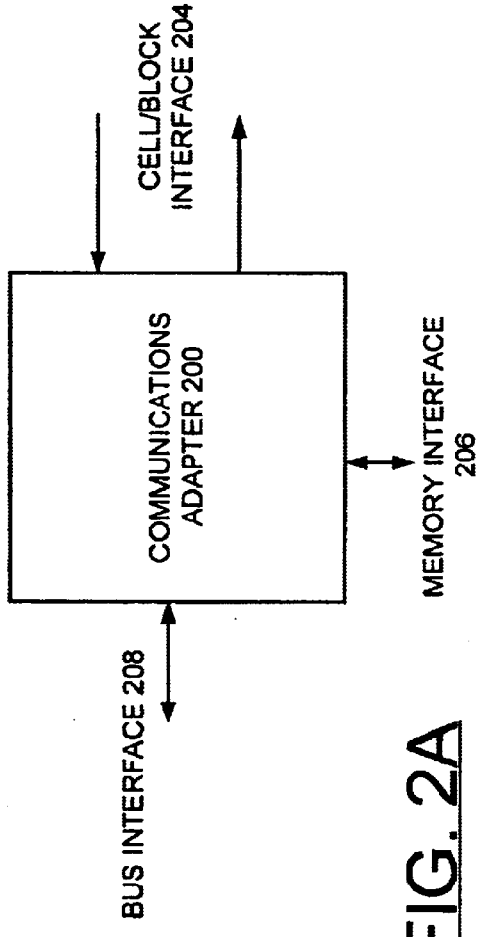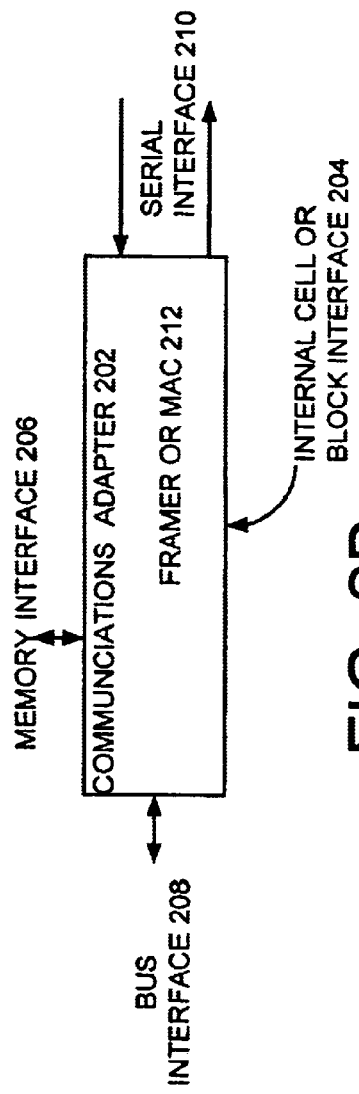

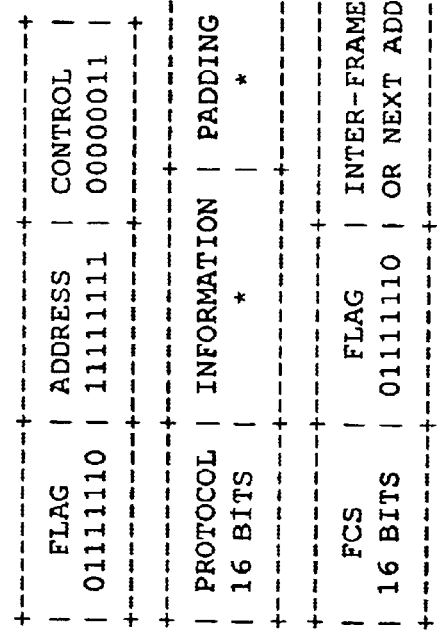
FIG. 12 Packet Over SONET (POS) PRIOR ART
FIG. 13 PPP HDLC FRAME STRUCTURE PRIOR ART
```
+----------+----------+----------+
|   FLAG   | ADDRESS  | CONTROL  |
| 01111110 | 11111111 | 00000011 |
+----------+----------+----------+
| PROTOCOL | INFORMATION | PADDING |
|  16 BITS |      *      |    *    |
+----------+-------------+---------+
|   FCS    |   FLAG   | INTER-FRAME FILL |
|  16 BITS | 01111110 | OR NEXT ADDRESS  |
+----------+----------+------------------+
```

ATM AND PPP OVER OC-12

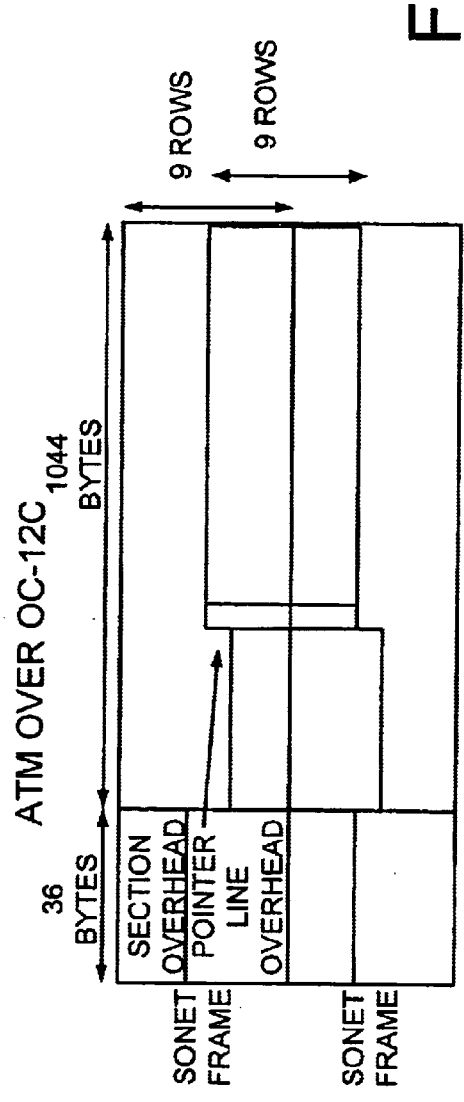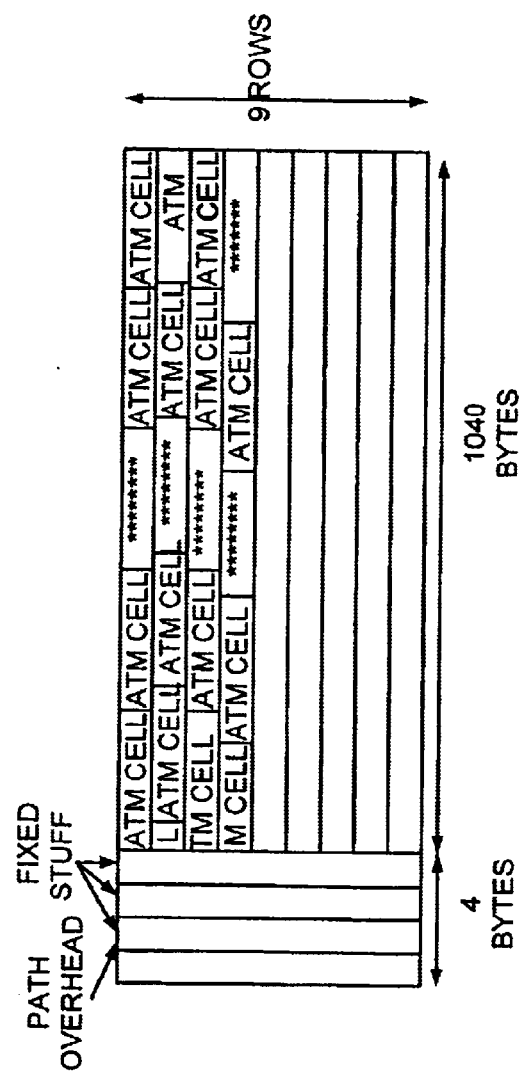

US 6,765,911 B1

COMMUNICATIONS ADAPTER FOR IMPLEMENTING COMMUNICATIONS IN A NETWORK AND PROVIDING MULTIPLE MODES OF COMMUNICATIONS

FIELD OF THE INVENTION

The present invention relates generally to the data processing field, and more particularly, relates to a method and communications adapter apparatus for implementing communications over a data communications network.

DESCRIPTION OF THE RELATED ART

An Asynchronous Transfer Mode (ATM) network described in "ATM: Theory and Application" by David E. McDysan and Darren L. Spohn, McGraw-Hill, 1994 is an internationally agreed upon technique for transmission, multiplexing and switching in a broadband network. ATM networks are designed to support the integration of high quality voice, video, and high speed data traffic. ATM networks use fixed size cells as a unit of transmission. As technology increases, it is expected that the Asynchronous Transfer Mode (ATM) technology and ATM networks will supply much of the need for high speed network interconnection.

In the face of emerging proprietary optical transmission protocols, SONET (Synchronous Optical Network) was provided as an open standard for synchronous data transmission on optical media. The standard was approved in 1988 by the predecessor to today's International Telecommunication Union, and in 1989 by the American National Standards Institute. SONET is widely deployed in the US. Using time division multiplexing, SONET works by dividing a fiber transmission path into multiple logical channels called tributaries. A tributary's basic unit of transmission is an STS-1 (synchronous transport signal, level 1) or OC-1 (optical carrier, level 1) signal. STS describes a transmission's signals while in an electrical state, and OC describes the same traffic after being converted into optical signals. STS-1 and OC-1 both operate at 51.84 Mbps. OC-2 is twice as fast, OC-3 is three times as fast, and so on. SONET is based on direct synchronous multiplexing, where separate signals are multiplexed directly into higher speed signals. For example, an OC-12 circuit might carry traffic from four OC-3 links. SONET line rates are currently operating up to OC-192 (9.953 Gbps). This is considerably faster than ATM's maximum current rate of 622 Mbps or Ethernet's current rate of 1 Gbps.

Ethernet is the original and still common name for the communications technique that has been standardized by the IEEE as some of the 802.x standards. 802.3 is the general Ethernet standard and 802.x are the link layer standards covering a variety of speeds.

A Packet over SONET communications interface is described in "POS-PHY™ SATURN COMPATIBLE PACKET OVER SONET INTERFACE SPECIFICATION FOR PHYSICAL LAYER DEVICES (Level 2)" by PMC-Sierra, Inc. Saturn Group, Issue 2, January, 1998. Also, RFC 2171 documents a multiple access protocol for transmission of network-protocol datagrams, encapsulated in High-Level Data Link Control (HDLC) over SONET/SDH (Synchronous Digital Hierarchy).

Asynchronous Transfer Mode or ATM is a communication technology whose use is becoming more widespread in some areas while receiving competition from Gigabit Ethernet and Packet Over SONET (POS) in other areas. The system designer and IS administrator is faced with the daunting task of choosing one technology over another, and allocating scarce development resource to optimize in their individual system one or another of these technologies. If there were a way to isolate the differences of these various technologies from the preparation for the use of the technology, the benefits would be widespread.

To this end, a need exists to design and construct communication adapters that provide a simple, efficient, and versatile interface to a system and at the same time be capable of communicating in a variety of modes.

SUMMARY OF THE INVENTION

Important objects of the present invention are to provide an improved method and apparatus for implementing communications in a communications network; to provide a method and apparatus for providing a variety of modes for communications and to provide such method and apparatus that overcome disadvantages of prior art arrangements.

In brief, a method and apparatus are provided for implementing communications in a communications network. The apparatus for implementing communications includes a system interface to the communications network. A scheduler schedules enqueued cells and enqueued frames to be transmitted. A segmenter segments frames into cells or frames applied to a media adaptation block for transmission in a selected one of multiple modes.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A and 2B are block diagram representations illustrating a first communications adapter and second communications adapter of the preferred embodiment;

FIG. 12 illustrates a packet over SONET (POS);

FIG. 13 illustrates a Point To Point Protocol (PPP) HDLC frame structure;

FIGS. 16A, 16B, 17A, 17B, 18A, 18B, 18C, 19A, 19B, 20A, and 20B illustrate ATM and PPP over optical channel, level 3c (OC-3c), OC-12 and OC-12c.

DESCRIPTION OF THE PREFERRED EMBODIMENTS

Figure 1:
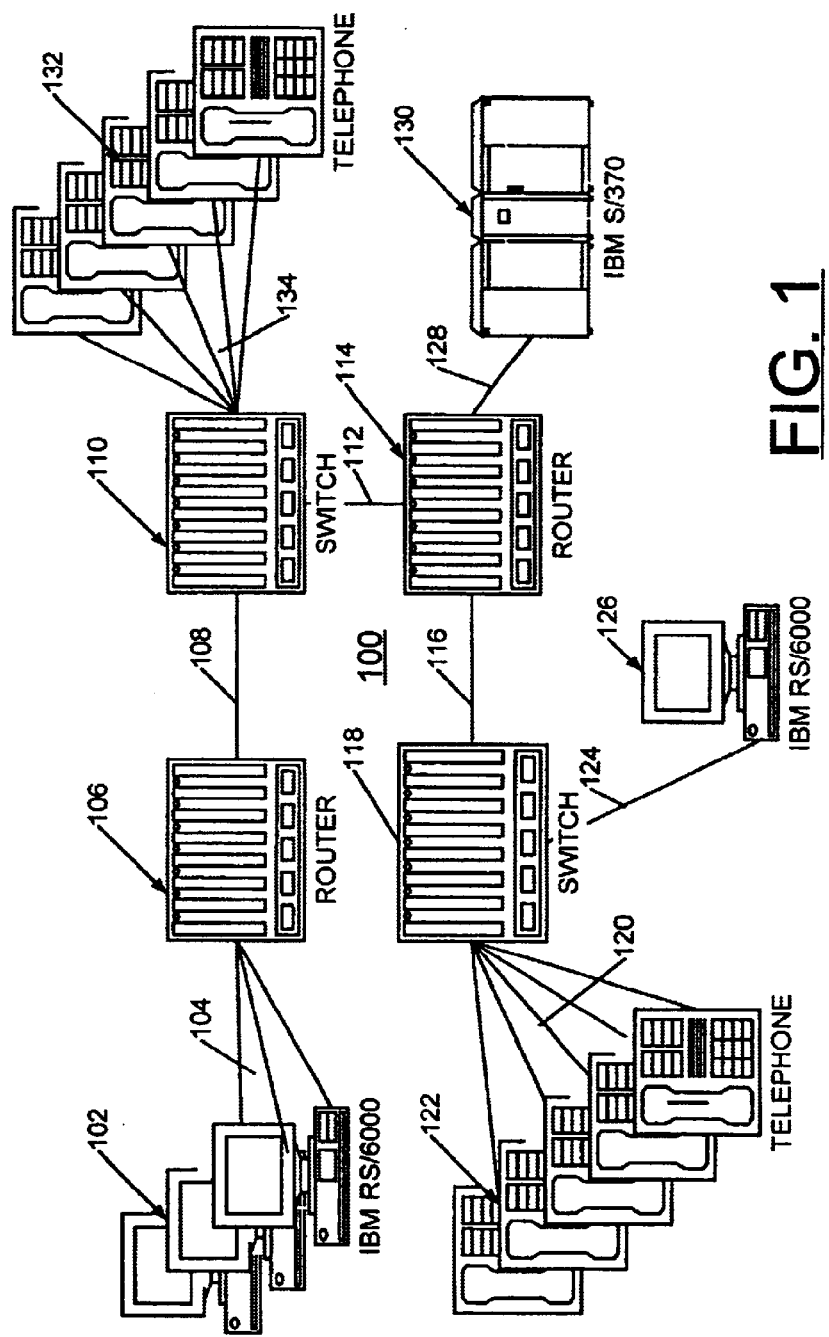
FIG. 1 is a block diagram representation illustrating a communications network system including communications adapters of the preferred embodiment.

Having reference to FIG. 1, there is shown a communications system generally designated by the reference character 100 which may be used with a first and second communication adapters 200 and 202 of FIGS. 2A and 2B. Communications system 100 carries telephone voice traffic and data communications. A host computer 102, such as the IBM RS/6000 workstation is an example host computer that advantageously includes one of the first and second communication adapters 200 and 202 of the preferred embodiment. The host computers 102 are connected via a plurality of data links 104 to a router 106. Router 106 is connected by a network link 108 to a switch 110. Router 106 advantageously includes one of the first and second communication adapters 200 and 202 of the preferred embodiment at the interfaces to the multiple data links 104 and the network link 108. A network link 112 connects the switch 110 to a router 114 that is connected by a network link 116 to a switch 118. Switch 110 advantageously includes one of the first and second communication adapters 200 and 202 of the preferred embodiment at the interfaces to the network links 108 and 112. Switch 118 is connected by a plurality of telephone lines 120 to multiple telephones 122. Switch 118 advantageously includes one of the first and second communication adapters 200 and 202 of the preferred embodiment at the interface to the network link 116. A data link 124 connects a host computer 126 to the switch 118. A data link 128 connects a mainframe computer 130, such as the IBM System 370 to the router 114. A plurality of telephone 132 are connected by multiple telephone lines 134 the switch 110. Router 114 advantageously includes one of the first and second communication adapters 200 and 202 of the preferred embodiment at the interfaces to the data link 128 and the network links 112 and 116. Both the mainframe computer 130 and host computer 126 advantageously includes one of the first and second communication adapters 200 and 202 of the preferred embodiment at the interface to the respective network data links 128 and 124.

In a network such as communications system 100, there exists a variety of traffic types, such as voice, video, data, e-mail, transactions, and the like. These traffic types have a variety of quality of service (QoS) requirements. First and second communications adapters 200 and 202 of the preferred embodiment allow a system administrator to tune the apapters and network to optimize performance.

Referring now to FIGS. 2A and 2B, there are shown communications adapter chips of the preferred embodiment including a first communications adapter 200 in FIG. 2A and a second communications adapter 202 in FIG. 2B. In FIG. 2A, first communications adapter 200 includes a cell/block interface 204, a memory interface 206 and a bus interface 208. In FIG. 2B, second communications adapter 200 includes an internal cell/block interface 204, a memory interface 206, a bus interface 208, and a serial interface 210 connected to a framer or media access-control (MAC) 212. The internal cell/block interface 204 is not recognizable outside the second communications adapter chip 202.

First and second communication adapters 200 and 202 are capable of communicating in the cell mode of ATM, the packet over SONET (POS) mode, and the frame mode of Gigabit Ethernet, where Ethernet means IEEE 802.3 standard. First and second communication adapters 200 and 202 use the same system interface for each of these communication media, but has circuitry that makes it possible for the communication media to be chosen later in the design process, in some cases after the communication adapter has been deployed. Specifically, the first communication adapter 200 can communicate via the ATM or POS protocols, and the second communication adapter 202 with a substantially similar system interface also can communicate with a Gigabit Ethernet network connection.

Figure 3:
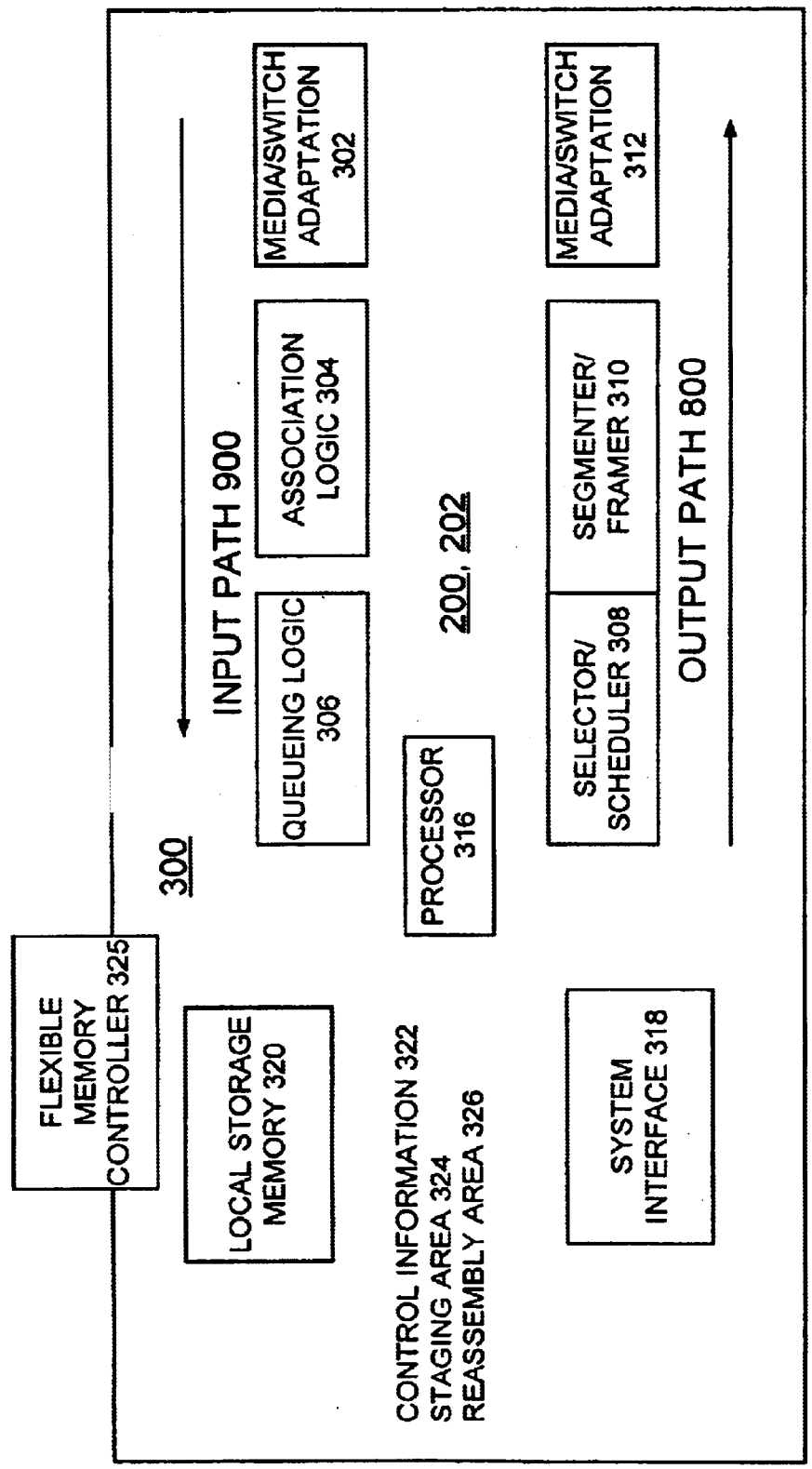
FIG. 3 is a block diagram representation illustrating a communications adapter circuit card arrangement of the preferred embodiment.

FIG. 3 is a block diagram representation illustrating a communications adapter circuit card arrangement generally designated by the reference character 300 of the preferred embodiment. Communications adapter circuit card 300 includes at least one of the first communication adapter 200 or the second communication adapter 202 including an output path 800 as illustrated and described in FIG. 8 and an input path 900 as illustrated and described in FIG. 9. As shown in FIG. 3, input path 900 includes a media adaptation block 302, an association logic block 304, and a queuing logic block 306 The association logic 304 provides a method for associating incoming data with state information. Output path 800 includes a selector/scheduler 308, a segmenter/framer 310 and a media adaptation block 312. When transmitting cells or buffers a segmenter is included in segmenter/framer 310. The selector/scheduler 308 of the output path 800 is a data movement mechanism for scheduling and for sequencing the selection of cells or frames to be transmitted. The segmenter/framer 310 enables the segmentation of frames or buffers into cells or frames, applied to the media adaptation layer 312. The media adaptation blocks 302 and 312 may be implemented by a transceiver and a framer or media access control (MAC). Communications adapter circuit card 300 optionally includes a processor 316 having access to the input path and/or the output path. The processor can optionally be a 32 bit PowerPC processor. This processor may optionally be a 64 bit PowerPC processor. Communications adapter circuit card 300 may optionally contain hardwired state machines, micro-coded programmable processors, and/or stored program, register and memory-based processors for the manipulation of the transmit and receive data to implement processor 316.

Communications adapter circuit card 300 includes a system interface 318, for example, a PCI bus 318, a local storage memory 320 that optionally is used for storing control information 322, staging area 324 and reassembly area 326. The local storage memory 320 can used for intermediate storage of received data during the reassembly or staging into the system including the staging area 324 and reassembly area 326. The local storage memory 320 for storing control information 322 may be implemented with on-chip memory within adapter chip 200 or 202 and/or separate static RAM or dynamic RAM or other storage devices. Optionally, communications adapter circuit card 300 may include a flexible memory controller 325 by which one or more of a variety of memory devices are connected to the controller 325. This would allow the support of a variety of memory of various types of memory while providing a constant functionality of a basic memory mechanism.

Communications adapter circuit card 300 can communicate via the ATM or POS protocols, and can communicate with a Gigabit Ethernet network connection via the system interface 318. The system interface 318 to communications adapter circuit card 300 is provided which transmits and/or receives at least one of frames, cells and/or buffers as FIFO buffers sequences of cells, frames or streams or sequences of bytes without packet boundaries or ordered bit sequences.

A related patent application is Ser. No. 09/244,548, filed on the same date as the present application, entitled: CELL FRAME SCHEDULING METHOD AND COMMUNICA- TIONS CELL/FRAME SCHEDULER, by Delp, et al., and assigned to the present assignee. The subject matter of the above identified patent application is incorporated herein by reference.

A related patent application is Ser. No. 09/243,956, filed on the same date as the present application, entitled: COMMUNICATIONS METHODS AND GIGABIT ETHERNET COMMUNICATIONS ADAPTER PROVIDING QUALITY OF SERVICE AND RECEIVER CONNECTION SPEED DIFFERENTIATION, by Branstad et al., and assigned to the present assignee. The subject matter of the above identified patent application is incorporated herein by reference.

A related patent application is Ser. No. 09/223,056, filed on Dec. 30, 1998 entitled: METHOD AND APPARATUS FOR USER PROGRAMMABLE PACKET TO CONNECTION TRANSLATION, by Albert A. Slane and assigned to the present assignee. The subject matter of the above identified patent application is incorporated herein by reference.

A related patent application is Ser. No. 09/166,004, filed on Oct. 2, 1998 and entitled: MEMORY CONTROLLER WITH PROGRAMMABLE DELAY COUNTER FOR TUNING PERFORMANCE BASED ON TIMING PARAMETER OF CONTROLLED MEMORY STORAGE DEVICE, by Gary P. McClannahan, and assigned to the present assignee. The subject matter of the above identified patent application is incorporated herein by reference.

Figure 4:
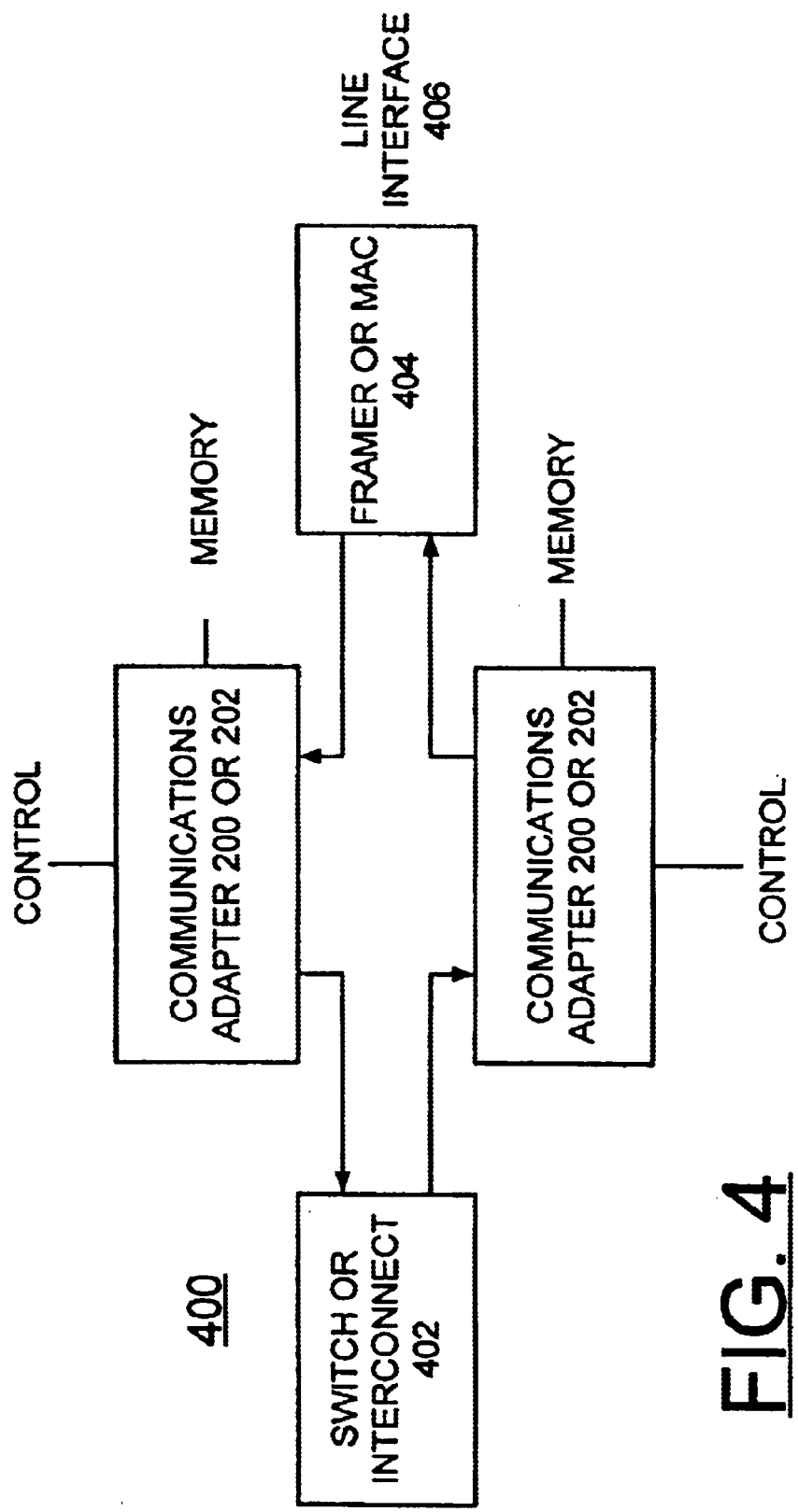
FIGS. 4, 5, 6 and 7 are block diagram representations, each illustrating a respective communications adapter arrangement of the preferred embodiment.

FIG. 4 illustrates a communications adapter arrangement generally designated by the reference character 400 of the preferred embodiment. Communications adapter arrangement 400 includes a pair of communications adapter chips 200 or 202 with one connected in the transmit and receive paths, as shown. Each of the communications adapter chips 200 or 202 includes a control input and associated memory. A switch or interconnect 402 is coupled between the communications adapter chips 200 or 202 in the transmit and receive paths. A framer or media access control (MAC) 404 connects the communications adapter chips 200 or 202 in the transmit and receive paths to a line interface 406.

Figure 5:
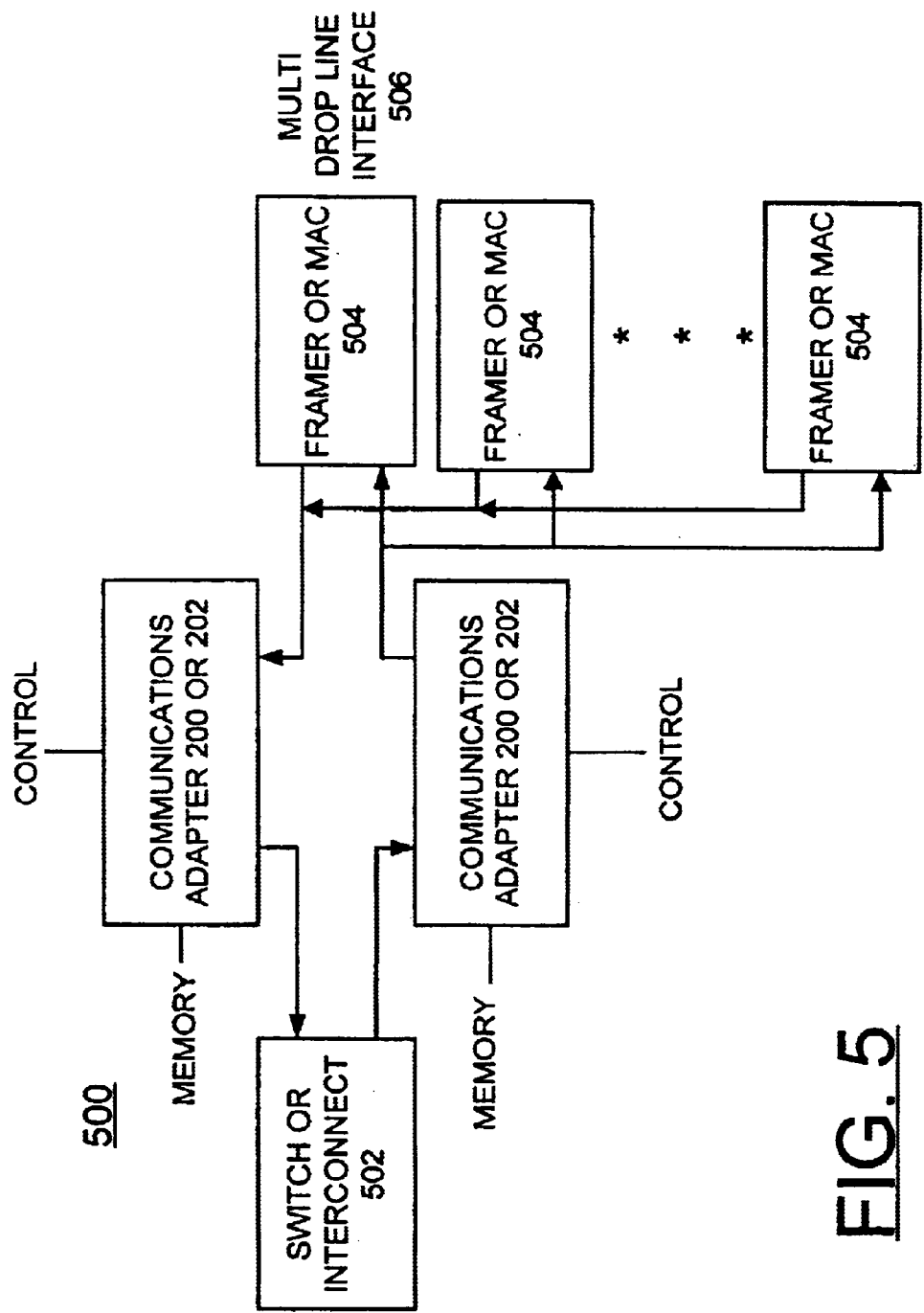

FIG. 5 illustrates a communications adapter arrangement generally designated by the reference character 500 of the preferred embodiment. Communications adapter arrangement 500 includes a pair of communications adapter chips 200 or 202 with one connected in the transmit and receive paths with a switch or interconnect 502 coupled between the communications adapter chips 200 or 202, as shown. A plurality of framers or media access controls (MACs) 504 connect the communications adapter chips 200 or 202 in the transmit and receive paths to a multi-drop line interface 506.

Figure 6:
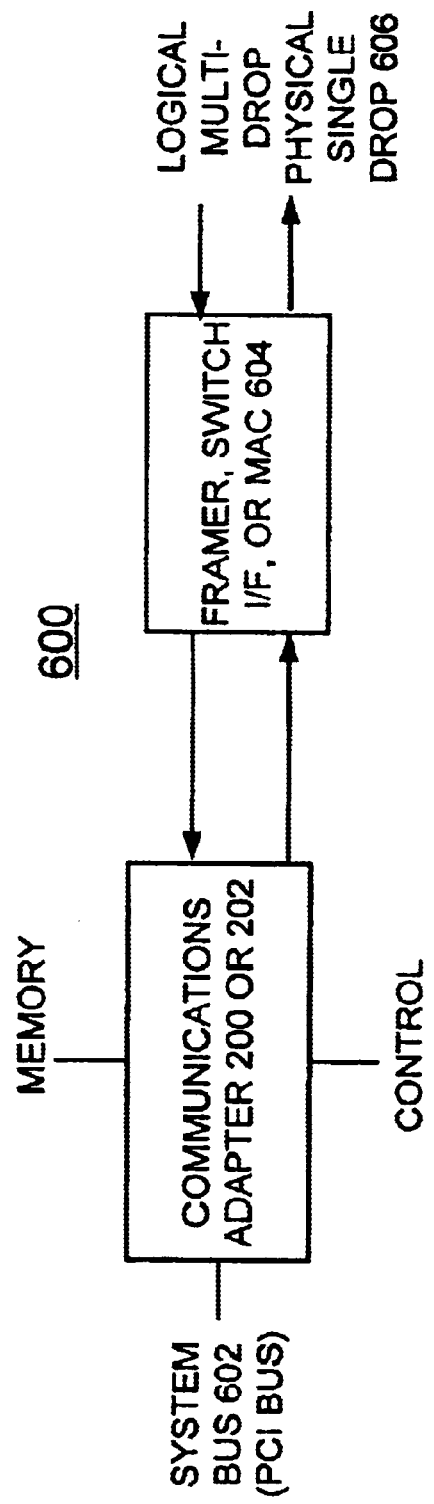

FIG. 6 illustrates a communications adapter arrangement generally designated by the reference character 600 of the preferred embodiment. Communications adapter arrangement 600 includes a communications adapter chip 200 or 202 connected to a system bus 602, such as a PCI bus. A framer or media access control (MAC) 604 connects the communications adapter chip 200 or 202 to a logical multi-drop, physical single drop connection 606.

Figure 7:
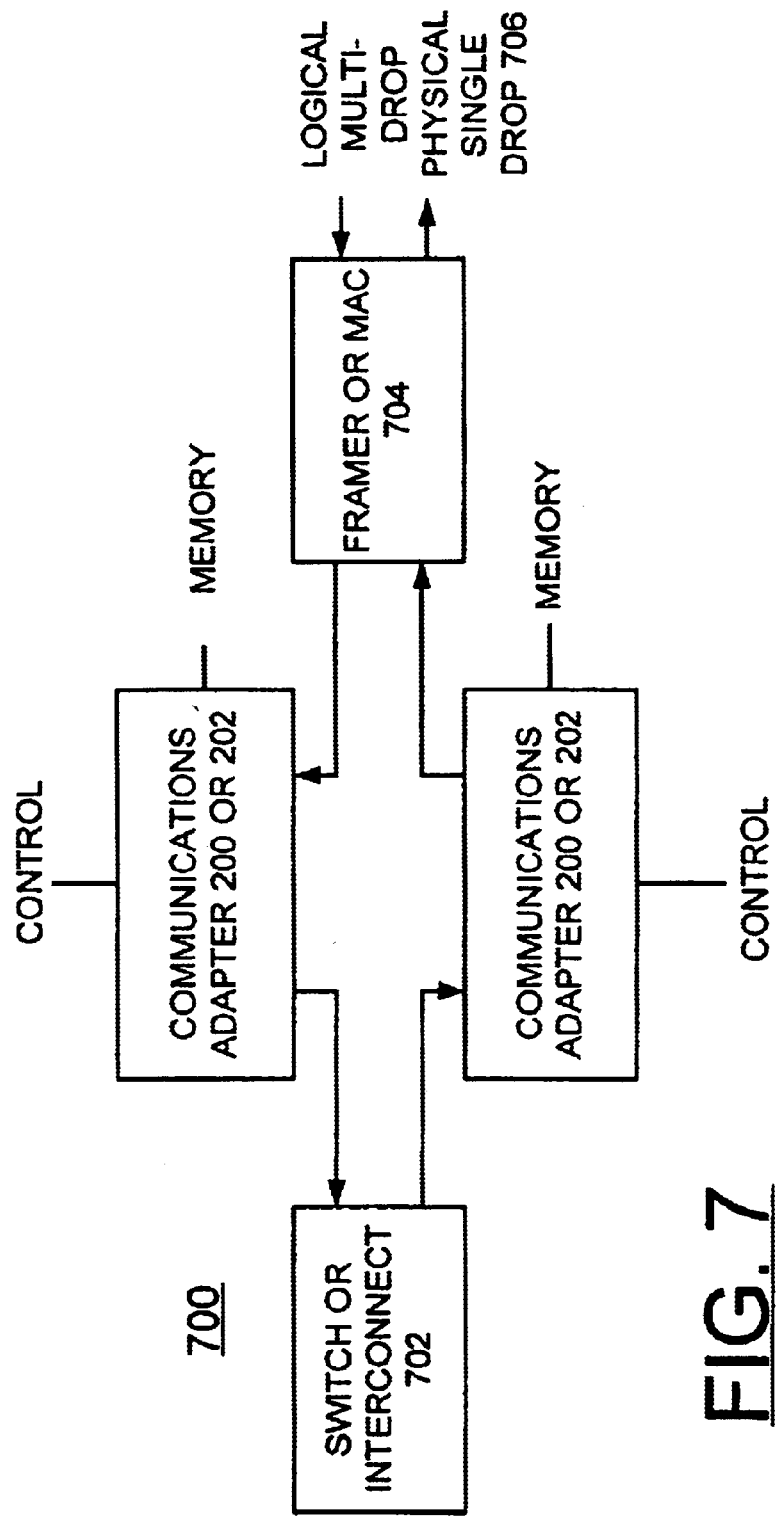

FIG. 7 illustrates a communications adapter arrangement generally designated by the reference character 700 of the preferred embodiment. Communications adapter arrangement 700 includes a pair of communications adapter chip 200 or 202 with one connected in the transmit and receive paths, as shown. Each of the communications adapter chips 200 or 202 includes a control input and associated memory. A switch or interconnect 402 is coupled between the communications adapter chips 200 or 202 in the transmit and receive paths. A framer or media access control (MAC) 704 connects the communications adapter chips 200 or 202 to a logical multi-drop, physical single drop connection 706.

Figure 7A:
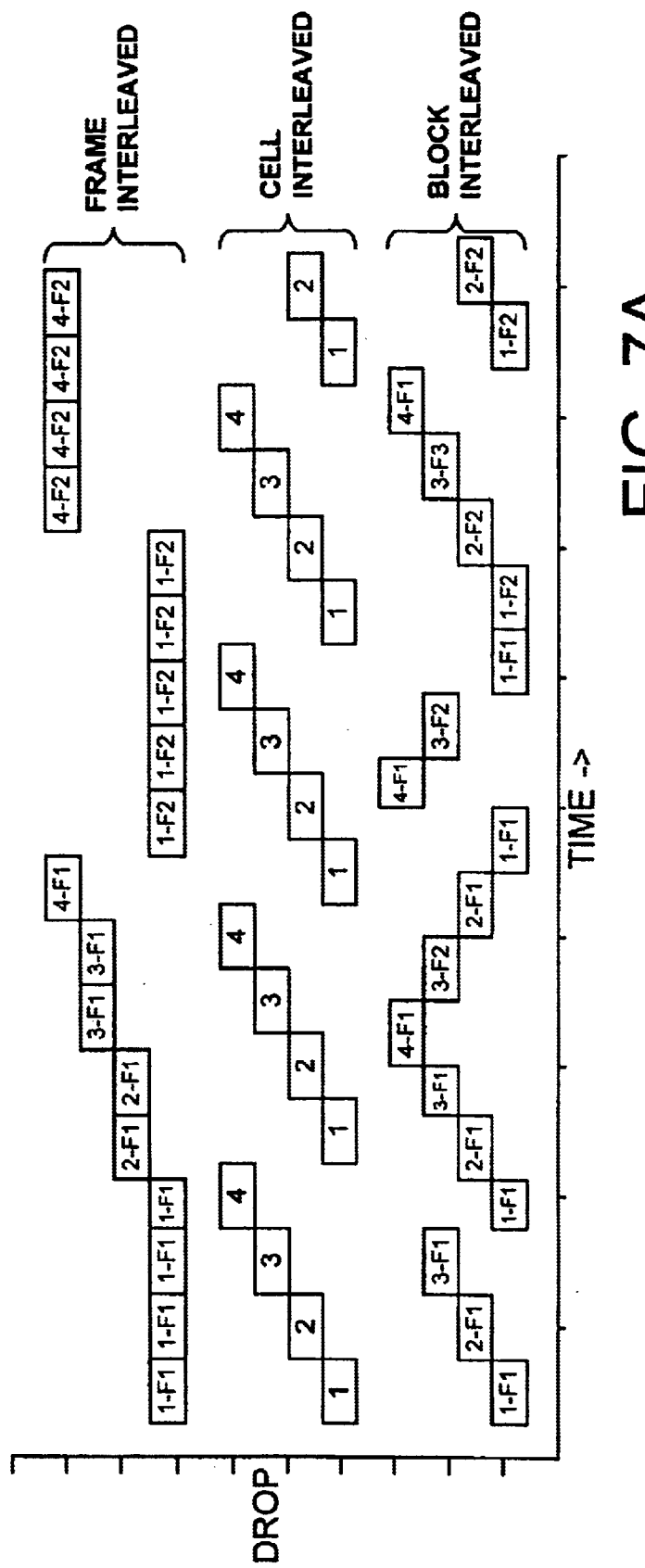
FIG. 7A is a chart illustrating exemplary frame, cell and block interleaving operations for a multiple drop line interface communications adapter arrangement of the preferred embodiment.

FIG. 7A provides a chart illustrating exemplary frame, cell and block interleaving operations by communications adapters 200, 202 of the preferred embodiment. FIG. 7A illustrates the three methods of multiplexing use of a shared communications adapter 200, 202 of the preferred embodiment between multiple drops. In FIG. 7A, exemplary frame, cell, and block interleaving operations are shown with four drops for purposes for illustration. It should be understood that the more or fewer drops can be used with the communications adapters 200, 202 of the preferred embodiment.

In FIG. 7A, exemplary frame interleaved operations are shown near the top of the chart. Four boxes labeled 1-F1, where 1 represents drop 1 and F1 represents frame 1, are shown near transmission time zero utilizing three and one/half (3½) transmission opportunities for drop 1, frame 1. Next along the time axis are two boxes labeled 2-F1, where 2 represents drop 2 and F1 represents frame 1, utilizing two (2) transmission opportunities for drop 2, frame 1. Next along the time axis are two boxes labeled 3-F1, where 3 represents drop 3 and F1 represents frame 1, utilizing two (2) transmission opportunities for drop 3, frame 1. Next box 4-F1, drop 4 frame 1, utilizes one transmission opportunity. Then five boxes 1-F2, drop 1, frame 2, utilizes five transmission opportunities. Next four boxes 4-F2, drop 4, frame 2, utilizes four transmission opportunities. As may be understood from FIG. 7A, in the frame operational mode, frames are interleaved drop wise on frame boundaries.

In FIG. 7A, exemplary cell interleaved operations are shown at the central portion of the chart with boxes labeled 1, 2, 3, 4. The cell interleaved operation illustrates a round robin scheduling of drops with a cell transmitted on each transfer, typical of ATM operation.

In FIG. 7A, exemplary block interleaved operations are shown near the bottom portion of the chart with sequential boxes labeled 1-F1, 2-F1, 3-F1, 1-F1, 2-F1, 3-F1, 4-F1, 3-F2, 2-F1, 1-F1, 4-F1 and so on. The block interleaved operation illustrates frame independent operation where the maximum sized blocks, such as 64 bytes are utilized. When a frame is completed in less than 64 bytes, the block is truncated earlier and interleaved.

Figure 8:
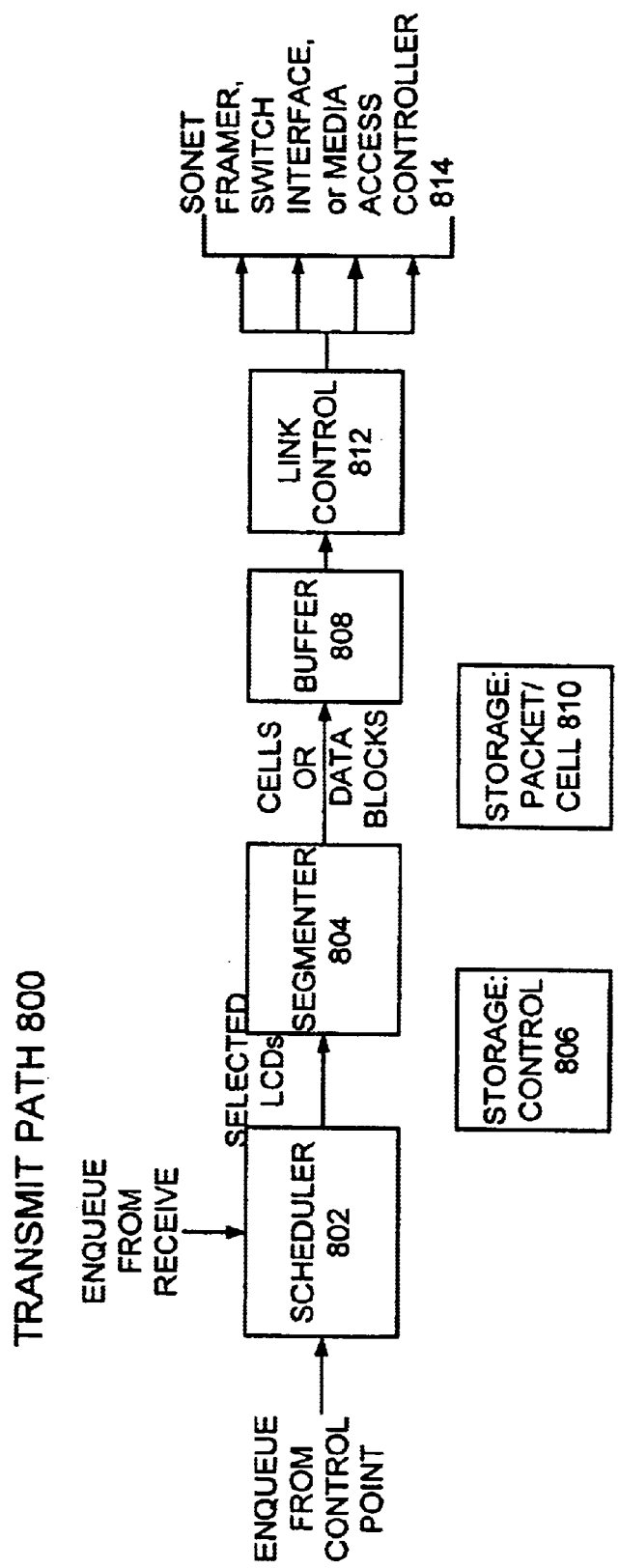
FIGS. 8 and 9 are block diagram representations, respectively illustrating a transmit path and a receive path inside the communications adapter of the preferred embodiment.
Figure 9:
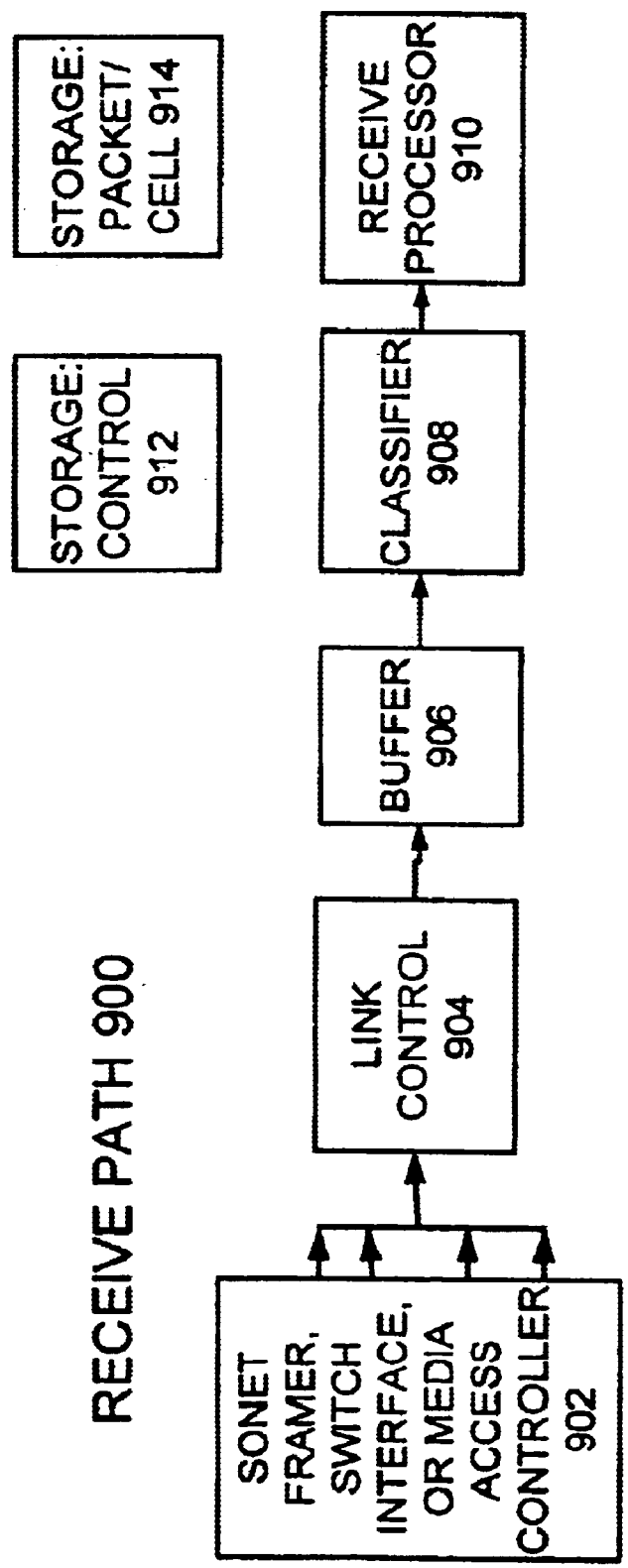

Having reference to FIGS. 8 and 9, first and second communication adapters 200 and 202 include at least one output path 800 and at least one input path 900 wherein an interface to this system is provided which transmits and/or receives at least one of frames, cells and/or buffers. In FIG. 8, the transmit path 800 includes a scheduler 802 receiving enqueues from receive or control point, schedules enqueued cells and frames and applies logical channel descriptors (LCDs) to a segmenter 804. This scheduler is described in more detail in the incorporated by reference application entitled CELL/FRAME SCHEDULING METHOD AND COMMUNICATIONS CELL/FRAME SCHEDULER, by Delp, et al. A storage mechanism: control 806 stores the LCDs, the data structures describing a data stream cell queue or frame queue. Segmenter 804 breaks larger transport units into cells for cell based output channels and applies the cells to an output buffer 808. In the case of a multi-drop frame based communication configuration, in the preferred embodiment, the frames are broken into data blocks of up to 64 bytes, with these blocks allowing the interleaving. Buffer 808 provides an asynchronous interface boundary. A storage mechanism: packet 810 can be provided as on-chip and/or external storage for storing packets. A link control 812 takes cells or blocks from buffer 808 and passes the cells or blocks to a SONET framer 814 in the preferred embodiment, or to a media access controller (MAC) for Ethernet connections. In the preferred embodiment, the off-chip storage, packet/cell and control, is implemented by a flexible memory controller 325 which can selectively or automatically detect the type of memory attached, and adjust its memory access protocols to match the capabilities of the attached memory modules, i.e., Fast Page mode DRAM, Extended Data Out DRAM, Synchronous DRAM, Zero Bus Turnaround SRAM, and DRAM with various Column Address Strobe latencies, and various Row Address Strobe to Data out times.

In FIG. 9, the receive path 900 includes a framer 902 which can be a single port or multiple media access port. Alternately, a Switch interface, or a media access controller which implements a data blocking protocol can provide the data input 902 for the receive path. A link control 904 is coupled between the framer/MAC/Switch interface 902 and a buffer 906. The link control 904 provides the input data handling and stores the incoming data in the buffer. A classifier 908 (as described in detail in above incorporated patent application by Albert A. Slane, entitled METHOD AND APPARATUS FOR USER PROGRAMMABLE PACKET TO CONNECTION TRANSLATION) associates said incoming data with local state information providing the coupling between the buffer 906 and a receive processor 910. A storage mechanism: control 912 maintains state for the LCDs and a storage mechanism: packet/cell 914 stores cells and packets. The storage mechanism: control 912 and storage mechanism: packet/cell 914 can be provided as on-chip or external storage. In the preferred embodiment, the off-chip storage, packet/cell and control, is implemented by a flexible memory controller 325 which can selectively or automatically detect the type of memory attached, and adjust its memory access protocols to match the capabilities of the attached memory modules, i.e., Fast Page mode DRAM, Extended Data Out DRAM, Synchronous DRAM, Zero Bus Turnaround SRAM, and DRAM with various Column Address Strobe latencies, and various Row Address Strobe to Data out times.

Figure 10:
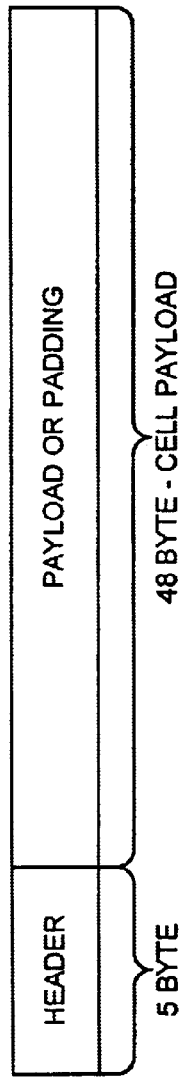
FIG. 10 illustrates an Asynchronous Transfer Mode (ATM) cell.

FIG. 10 illustrates an Asynchronous Transfer Mode (ATM) cell. The ATM cell includes a 5 byte header and 48 byte cell payload or padding.

Figure 11:
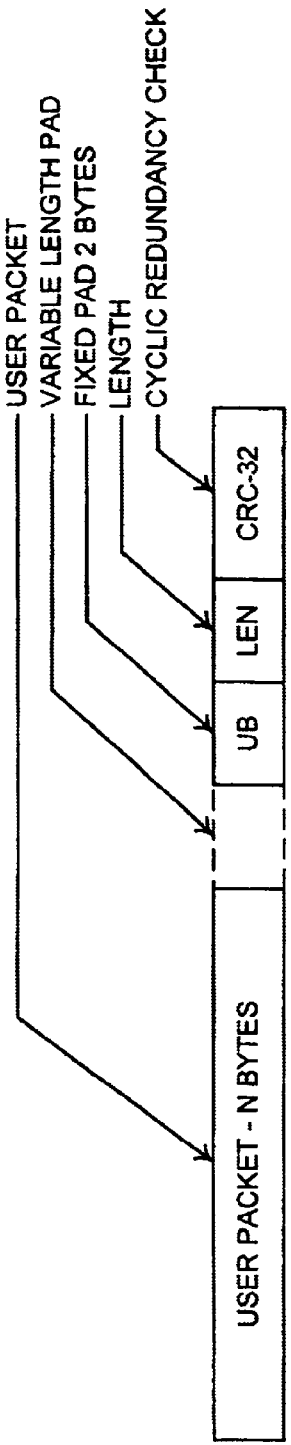
FIG. 11 illustrates an ATM AAL-5 frame.

FIG. 11 illustrates an ATM AAL-5 frame. The ATM AAL-5 frame includes a user packet including a variable number of (N) bytes, a variable length pad, a fixed 2 byte pad UB, a length field LEN and a cyclic redundancy check CRC-32.

FIG. 12 illustrates a packet over SONET (POS) structure including a POS header, user packet and a POS trailer.

FIG. 13 illustrates a Point To Point Protocol (PPP) HDLC frame structure which is the framing structure used by Packet over SONET. FIG. 13 does not show start/stop bits for asynchronous links, nor any bits or octets inserted for transparency. The illustrated fields are transmitted from left to right.

From the data in FIGS. 10 and 11, it can be seen that a packet of length L will be transmitted on an ATM line with A data bytes, where A=53*int((L+8+47)/48); where int returns the greatest integer part of the function ((L+8+47)/48).

From the data in FIGS. 12 and 13, it can be seen that a packet of length L will be transmitted on an Packet over SONET line using the Point-to-Point Protocol (PPP) line with P data bytes, where P=2*int((L+8)/2). The granularity of the transmissions is determined by resulting value of A data bytes or P data bytes.

Figure 14A:
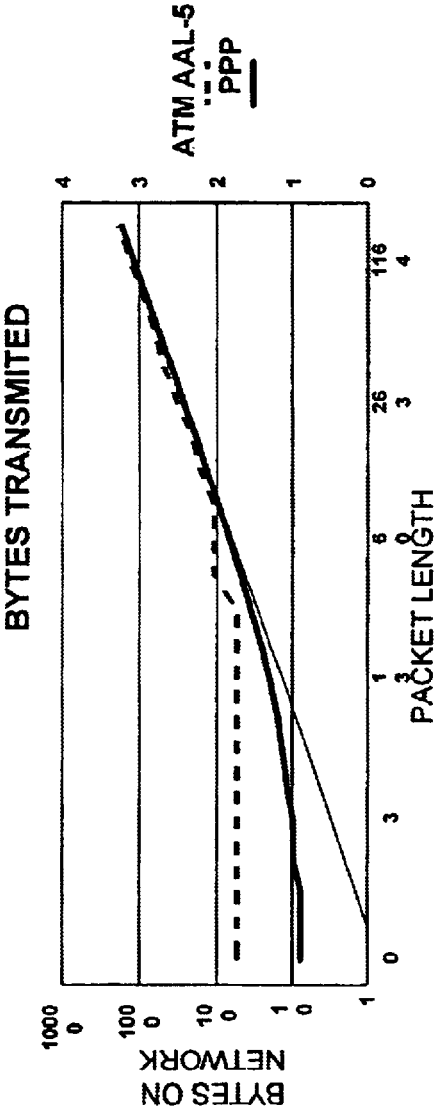
FIGS. 14A and 14B illustrate the number of bytes transmitted and the transmission efficiency of ATM and PPP for various packet lengths.
Figure 14B:
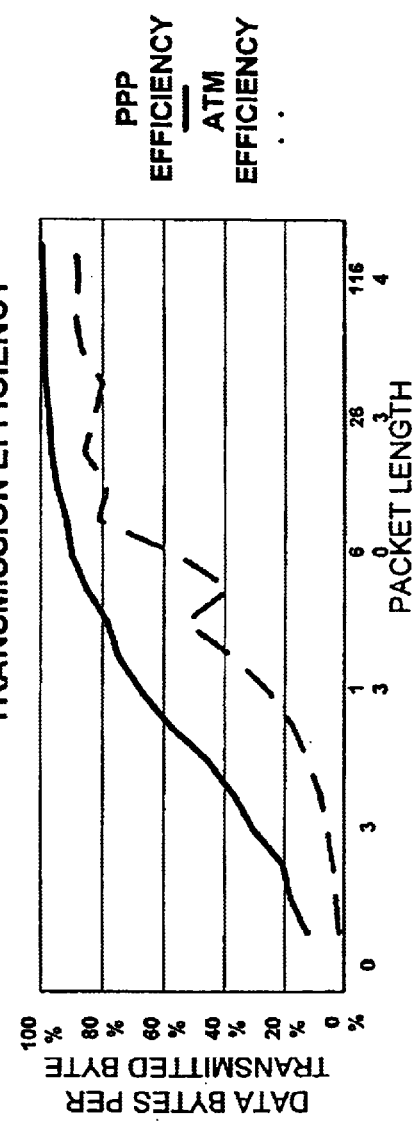

FIG. 14A illustrates the relationship of A and P to L for a range of L. It can be seen that for all values of $L_s$; the ATM overhead is greater than the PPP overhead. FIG. 14B illustrates the transmission efficiency of both media as calculated by the percentage of data bytes transmitted per transmitted byte. It can be seen that for all values of L, the ATM efficiency is less than the PPP efficiency. Because these calculations ignore the start/stop bits for asynchronous links, and any bits or octets inserted for transparency, it is possible that in some cases, the relationship will be reversed, but in the bulk of cases, the relationship will be substantially as shown. Using transmission efficiency at the only figure of merit, PPP would be the preferred transmission scheme.

Figure 15:
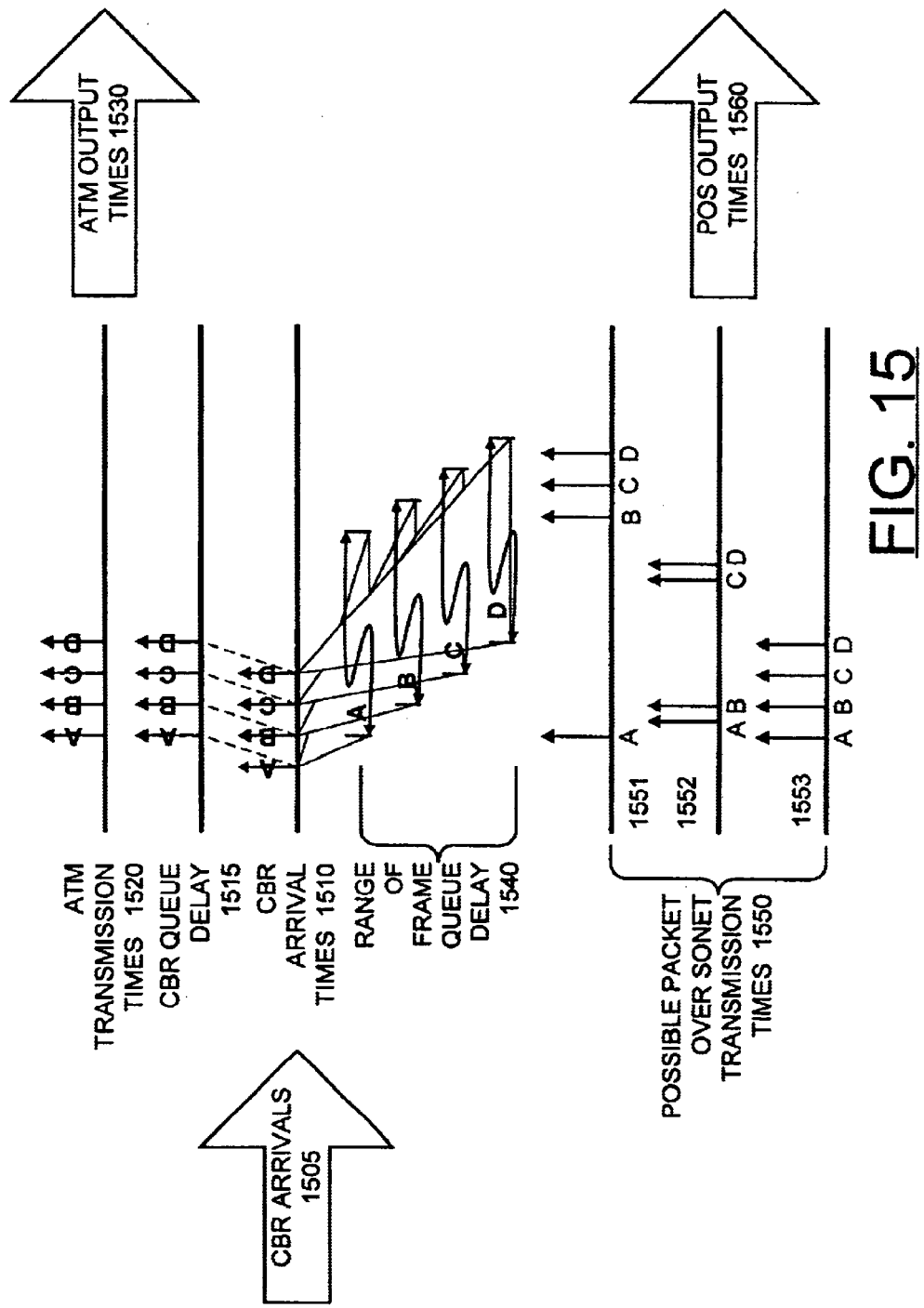
FIG. 15 illustrates constant bit rate (CBR) arrivals together with POS and ATM transmission times.

FIG. 15 illustrates the concept of an alternate figure of merit, i.e., the variance of latency. The process illustrated has two paths, the cell based path of ATM and the variable frame sized path of POS. Both paths take as input the arrival stream of constant bit rate traffic 1505 with a time relationship of arrival times as shown in 1510, i.e., evenly spaced data arrival with respect to time. Because ATM cells are fixed in size, the queue delay in an ATM system more closely approximates a constant, as illustrated in 1515, so the ATM transmission times 1520 maintain the same relation as the inputs with just a shift in time.

In the constant bit rate (CBR) arrivals with POS output, the CBR data may be in a queue behind a frame of variable size. The range of frame delay 1540 is a probabilistic distribution, and is independent of the CBR arrival time 1510, because it is due to variation in the length of packets/frames on other communication channels. Some of the possible POS transmission time sequences 1550 are illustrated in 1551, 1552, and 1553. Output pattern 1551 shows a large delay between the output of A and B, sequence 1552 shows very small time delay between A and B and C and D, and a much larger time between B and C. Sequence 1553 shows that POS can at times have the same behavior as the ATM/cell based output.

The figure of merit in FIG. 15 is the data latency variation, which contributes to the downstream buffering requirements and the ability to support various qualities of service, independently over the same communication line. The present invention allows the choice of an optimal figure of merit to be deferred until after system deployment by providing systems and methods that are agile in cell and frame based communication. Additionally, as is illustrated in FIG. 18, a single line can carry both types of traffic, optimizing each figure of merit for the appropriate traffic.

Figure 16A:
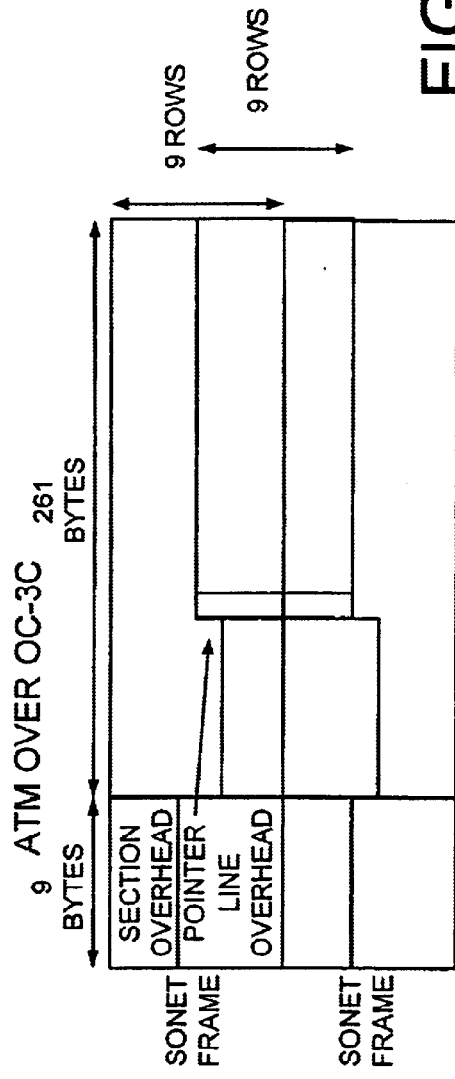
Figure 16B:
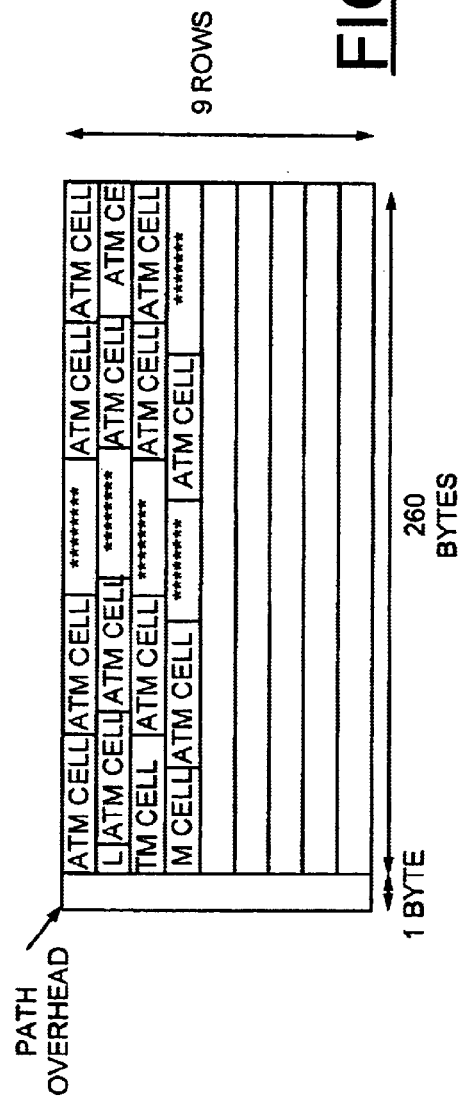
Figure 17A:
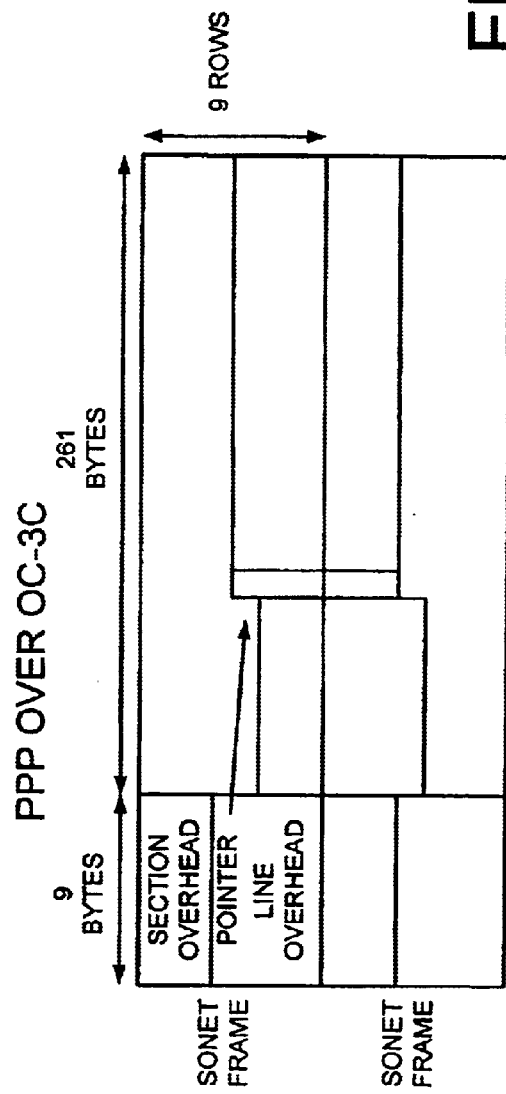
Figure 17B:
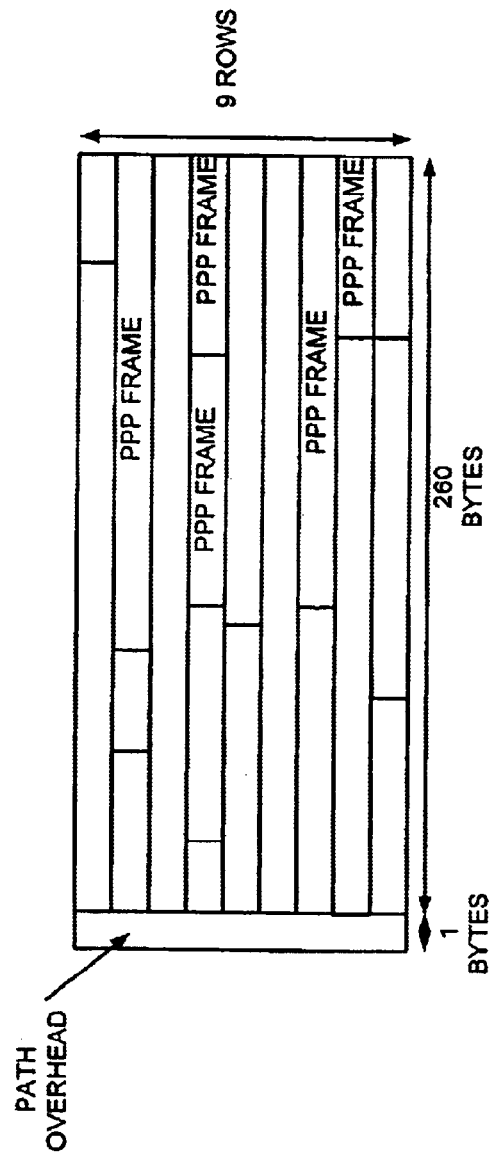
Figure 18A:
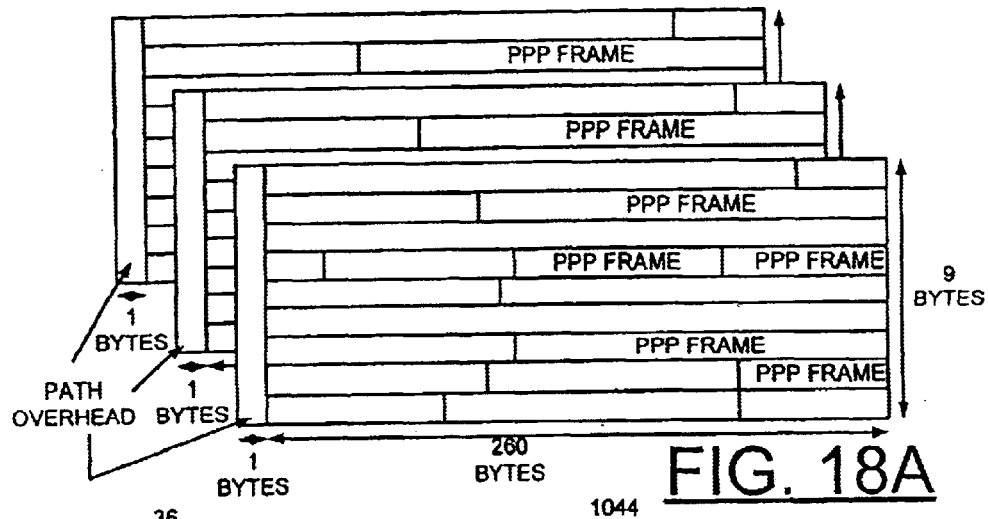
Figure 18B:
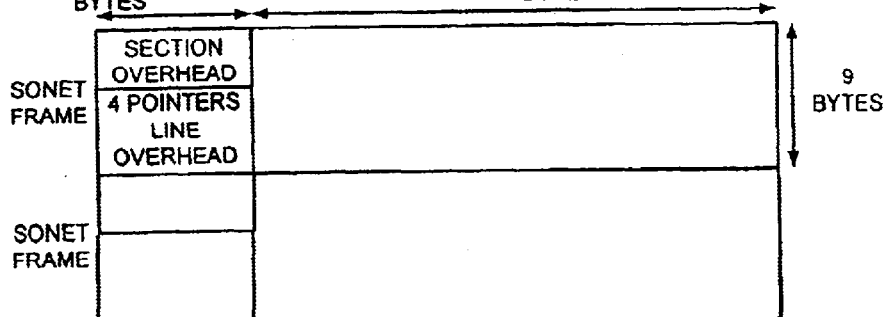
Figure 18C:
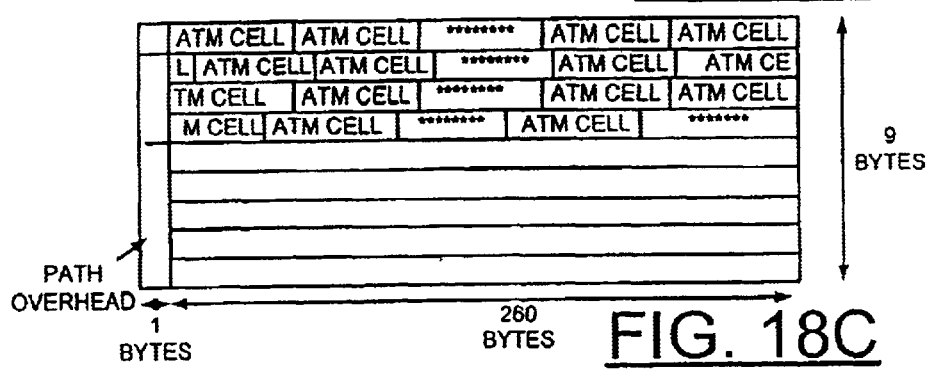
Figure 20A:
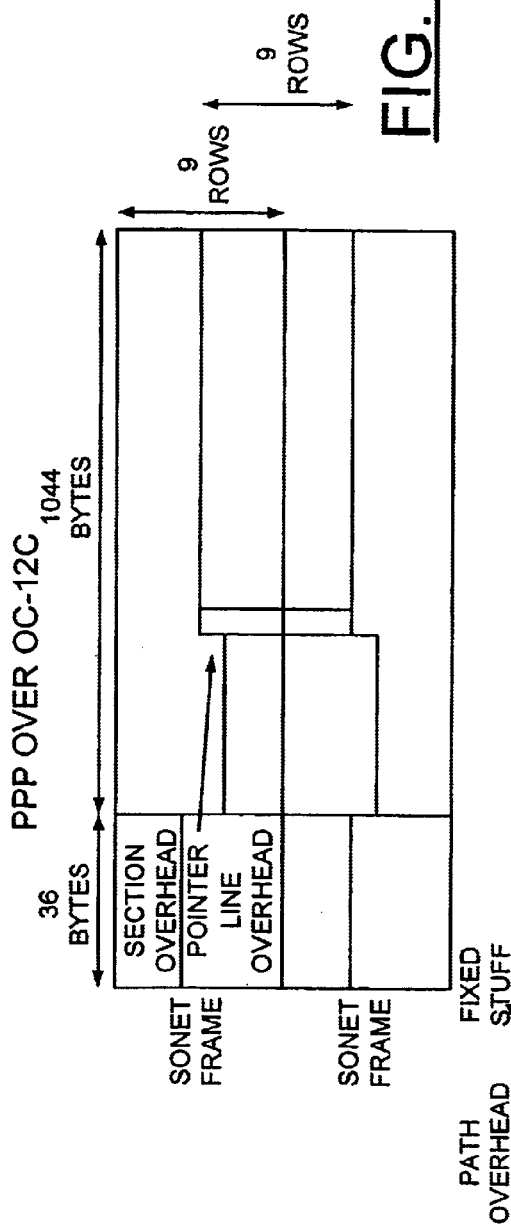
Figure 20B:
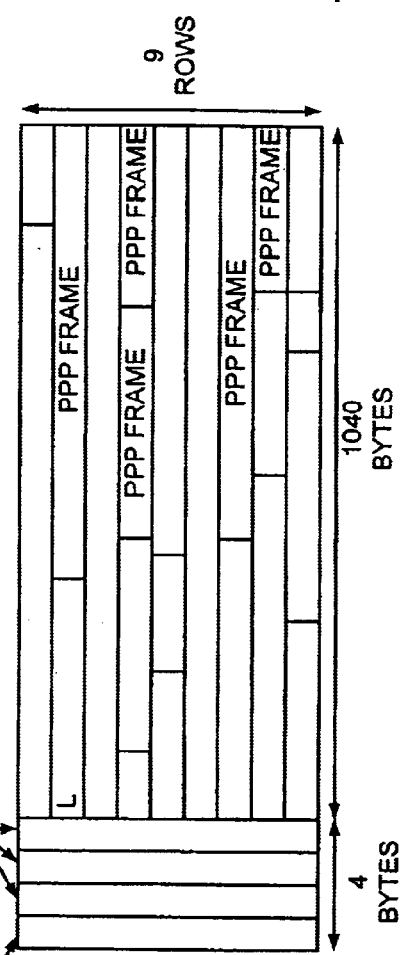

FIGS. 16A, 16B, 17A, 17B, 18A, 18B, 18C, 19A, 19B, 20A, and 20B illustrate ATM and PPP over optical channel, level 3c (OC-3c), OC-12 and OC-12c. The c in OC-3c means that all of the payload section is concatenated together which means that OC-3c carries one type of traffic. FIGS. 16A and 16B illustrate ATM cells put on the SONET frame over OC-3c. FIGS. 17A and 17B illustrate point to point protocol (PPP) frames put on the SONET frame over OC-3c. FIGS. 18A, 18B and 18C illustrate ATM cells and PPP frames put on the SONET frame over OC-12. OC-12 is 4 times as fast as OC-3c and allows byte interleaving, for example, including four OC-3c interleaved together. For example, OC-12 may include one ATM over OC-3c and three PPP over OC-3c interleaved together, with the multiple traffic types allowing for QoS differentiation. FIGS. 19A and 19B and FIGS. 20A and 20B respectively illustrate ATM cells and PPP frames put on the SONET frame over OC-12c, without byte interleaving.

What is claimed is:

1. An apparatus for implementing communications in a communications network comprising:

a system interface;

a scheduler for scheduling enqueued cells and enqueued frames to be transmitted; and a segmenter for segmenting frames into cells; said cells or said frames being applied to a media adaptation block for transmission in a selected one of multiple transmission modes;

an input path including association logic for associating incoming data with state information and queuing logic for reassembly and processing of incoming data;

said scheduler and said segmenter are included in an output path; and a processor having access to said input path and said output path.

2. The apparatus for implementing communications in a communications network as recited in claim 1 wherein said system interface comprises a bus.

3. The apparatus for implementing communications in a communications network as recited in claim 1 wherein said processor comprises a 32 bit PowerPC processor.

4. The apparatus for implementing communications in a communications network as recited in claim 1 wherein said processor comprises a 64 bit PowerPC processor.

5. The apparatus for implementing communications in a communications network as recited in claim 1 wherein said processor comprises a micro-coded processor.

6. An apparatus for implementing communications in a communications network comprising:

a system interface;

a scheduler for scheduling enqueued cells and enqueued frames to be transmitted;

a segmenter for segmenting frames into cells; said cells or said frames being applied to a media adaptation block for transmission in a selected one of multiple transmission modes;

said media adaptation block including a transceiver; and said media adaptation block including a framer or a media access control (MAC).

7. The apparatus for implementing communications in a communications network as recited in claim 1 wherein said media adaptation block includes a framer.

8. The apparatus for implementing communications in a communications network as recited in claim 1 wherein said media adaptation block includes a media access control.

9. The apparatus for implementing communications in a communications network as recited in claim 1 wherein said selected one of multiple transmission modes includes a packet over SONET mode.

10. The apparatus for implementing communications in a communications network as recited in claim 1 wherein said selected one of multiple transmission modes includes an Asynchronous Transfer Mode (ATM) over SONET.

11. The apparatus for implementing communications in a communications network as recited in claim 1 wherein said selected one of multiple transmission modes includes a point to point protocol (PPP) over SONET.

12. The apparatus for implementing communications in a communications network as recited in claim 1 wherein said selected one of multiple transmission modes includes an Asynchronous Transfer Mode (ATM) and point to point protocol (PPP) over SONET.

13. The apparatus for implementing communications in a communications network as recited in claim 1 wherein said selected one of multiple transmission modes includes an Asynchronous Transfer Mode (ATM).

* * * * *